(12) United States Patent
Zhijian

(10) Patent No.: US 11,573,291 B1
(45) Date of Patent: *Feb. 7, 2023

(54) POSITION LOCATOR

(71) Applicant: Li Zhijian, Fujian (CN)

(72) Inventor: Li Zhijian, Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,677

(22) Filed: Jan. 12, 2022

Related U.S. Application Data

(63) Continuation of application No. 17/510,438, filed on Oct. 26, 2021, now Pat. No. 11,475,756.

(51) Int. Cl.
  *G01S 7/481* (2006.01)
  *G01S 17/46* (2006.01)

(52) U.S. Cl.
  CPC ............ *G01S 7/4813* (2013.01); *G01S 17/46* (2013.01)

(58) Field of Classification Search
  CPC ................................ G01S 7/4813; G01S 17/46
  USPC .......................................... 356/356, 614–640
  See application file for complete search history.

(56) References Cited

U.S. PATENT DOCUMENTS

| | | | |
|---|---|---|---|
| 2015/0204652 A1* | 7/2015 | Olsson | G01J 3/0262 356/614 |
| 2020/0102715 A1* | 4/2020 | Walliman | E02D 35/005 |
| 2020/0368451 A1* | 11/2020 | Franke | A61M 5/3257 |
| 2021/0033729 A1* | 2/2021 | Alalusi | G01S 17/86 |
| 2021/0212695 A1* | 7/2021 | Sugirthamuthu | A61B 10/0233 |
| 2022/0013316 A1* | 1/2022 | Zhong | H01H 50/546 |

* cited by examiner

*Primary Examiner* — Tri T Ton
(74) *Attorney, Agent, or Firm* — Jennifer Meredith, Esq.; Meredith Attorneys, PLLC

(57) ABSTRACT

A removable position locator having a light source and attachment hardware for attaching the removable position locator to a body, the attachment hardware has at least one hardware light-transmitting through-hole, the removable position locator has at least one locator light-transmitting through-hole and the light from the light source is projected outward through the light-transmitting through-hole, the body has an opening that is substantially the same or bigger than the hardware light-transmitting through-hole and the opening is substantially aligned with the hardware light-transmitting through hole and the locator light-transmitting through-hole when the hardware is attached to the body.

16 Claims, 22 Drawing Sheets

POSITION LOCATOR

This application claims priority to and is a continuation of U.S. patent application Ser. No. 17/510,438 filed Oct. 26, 2021 and Chinese patent application number 202111063066.1 filed Sep. 10, 2021. The invention relates to the field of positioning equipment, in particular, a position locator.

TECHNICAL FIELD

Background Technology

The position locator is a device used for location positioning and tracking. In outdoor activities such as hiking and camping, people generally like to hang a location finder on their backpacks. The existing positioning finder is mainly divided into electronic positioning finder installed with GPS and other positioning modules, whose main function is to be used for a wide range of positioning; there is another kind of positioning finder for small range positioning, which is convenient for users to find the items, the positioning finder mainly relies on the sound way to prompt the user of its location. The existing audible positioning finder mainly uses the speaker to prompt the alarm, the speaker in the use of the process is very power-consuming, the battery only lasts only 3-5 days on average, the battery needs to be replaced when the power is exhausted, it is extremely inconvenient to use.

The purpose of the present invention is: to overcome the above shortcomings to provide a power-saving and high volume of sound positioning finder.

The invention is realized by the following technical solutions: a position locator, comprising a shell, the interior of the shell is provided with a first resonant chamber located above, a second resonant chamber located below and a buzzer element for separating the first resonant chamber and the second resonant chamber and for sound, the position locator also includes a main board connected to the buzzer element for controlling the buzzer element on and off and a power supply device connected to the main board for powering the main board. And the buzzer element and the main board is putted up and down.

In order to better implement the present solution, the following optimized solution is also provided.

Preferably, said first resonant chamber and said second resonant chamber form a large and a small space.

In order to facilitate the positioning of light projection, the central part of the buzzer element is provided with a light transmission hole, and the light source above the light transmission hole is controlled by the main board, and the bottom of the second resonance chamber is provided with a light transmission channel connected to the outside, and the light from the light source is projected outward through the light transmission hole, the second resonance chamber and the light transmission channel in turn.

Preferably, there is a light-transmitting projection part installed in the light-transmitting channel, wherein the projection part is provided with a predetermined projection pattern, wherein the light source projected on the projection part can project outwardly to display said projection pattern.

For further sound amplification, the shell or projection part is further provided with a sounding through hole for easy sounding.

Preferably, the peripheral diameter of the buzzer element is: 6.5 mm-50 mm, and the thickness of said buzzer element is: 0.15 mm-0.85 mm.

Preferably, the buzzer element further comprises a substrate and a conductive ceramic medium set on the substrate, wherein the substrate is made of one of copper, stainless steel, nickel alloy and iron or any combination thereof.

To prevent light dispersion, the projection part is provided with a light-transmitting column extending into or below the light-transmitting through-hole.

Preferably, wherein the main board is mounted in the shell and located above the buzzer element, wherein the main board and buzzer element are connected to each other by a thimble or flexible folding foot.

To facilitate installation, wherein the shell further comprises a lower shell and an upper shell.

Preferably, wherein the upper surface of the upper shell is provided with a recessed battery compartment, said power supply device is a button battery and installed in the battery compartment, in the top of the battery compartment is also covered with a cover.

Preferably, the main board is also provided with a communication module that can communicate with other devices.

In order to ensure that the sound is more focused and does not disperse, the single hole diameter of the sounding through hole for easy sounding is not exceed 10 mm.

In order to help the sound to be amplified by the air rotating therein, wherein the second resonance chamber is in the shape of a funnel with a large top and a small bottom.

Further in order to help the sound to be amplified by the air rotating therein, wherein the second resonance chamber and the first resonance chamber form a funnel-shaped air circulation system.

Preferably, wherein the light-transmitting through-hole has a diameter of not more than 6 mm.

Compared to the prior technology, the beneficial effects of the present invention are:

1. The position locator described in the present invention uses a buzzer element to make sound compared to a buzzer or a speaker, etc., consumes less power, and in the case of using button batteries at the same time, the service life can be extended by more than double, and there are two resonance chambers set in the shell, and the two can be used together to expand the sound emitted by the buzzer element.

The position locator described in the present invention also has a light-transmitting hole in the buzzer element, and the light from the light source can be projected on the projection part through the light-transmitting hole, thus projecting the predetermined logo pattern outward, which is convenient for the user to find in the dark environment.

3. The overall structure of the position locator described in the present invention is light and thin, easy to install, and reasonably designed to facilitate the promotion of use.

DESCRIPTION OF THE ATTACHED DRAWINGS

Figure 1:
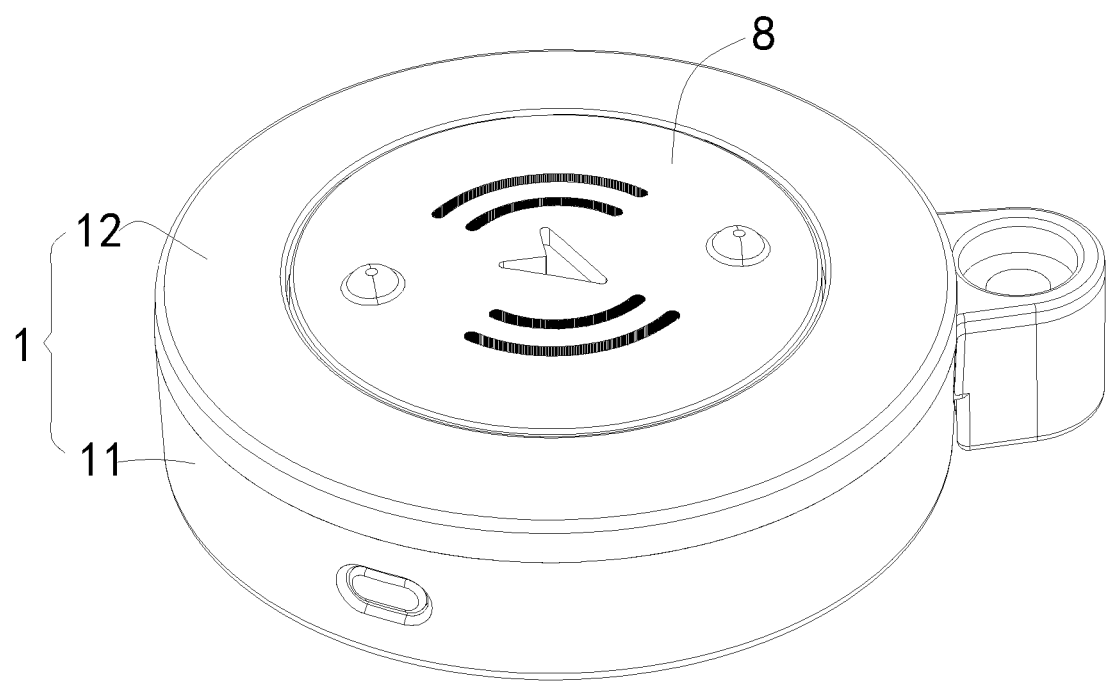
FIG. 1 is a schematic diagram of the structure of Example I of the present invention.
Figure 2:
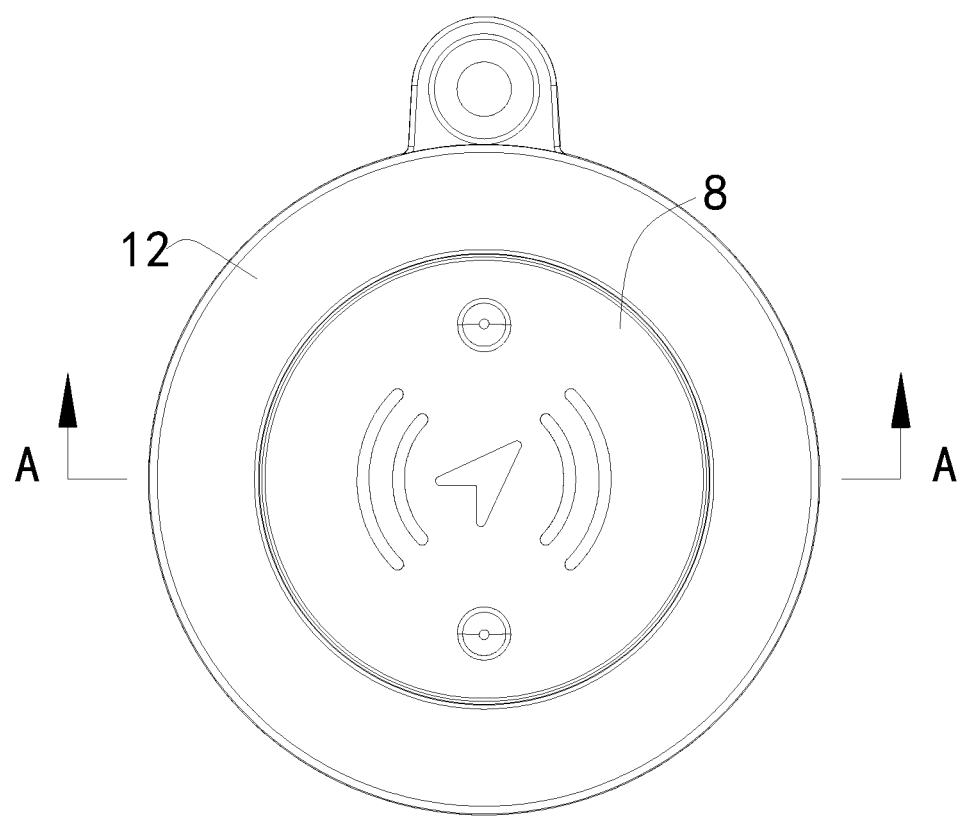
FIG. 2 is a top view of example one of the present invention.

Marked number Description: 1—shell, 11—lower shell, 12—upper shell, 121—battery compartment, 2—buzzer element, 21—transmitting through-hole, 3—main board, 31—light source, 4—contacts, 5—projection parts, 51—acoustic through-hole, 52—transmitting column, 6—thimble, 7—elastic folding foot, 8—cover, a—first resonance chamber, b—second resonance chamber, b1—transmitting channel.

SPECIFIC IMPLEMENTATION

The present invention is described in detail below in conjunction with the accompanying illustrations.

Example 1

As shown in FIGS. 1-8, a position locator, comprising a shell [1], the interior of said shell [1] is provided with a first resonant chamber a located above, a second resonant chamber [b] located below and a buzzer element [2] for separating the first resonant chamber a and the second resonant chamber [b] and for sounding, wherein the position locator further comprises a main board [3] connected to the buzzer element [2] for controlling the power on and off of the buzzer element [2] and a power supply connected to the main board [3] for supplying power to the main board [3].

The position locator uses buzzer element [2] to make sound, compared to the peak sounders or speakers, etc., the buzzer element [2] consumes less power and lasts longer, using button batteries to meet the requirements of use. The buzzer element [2] mainly consists of a piezoelectric ceramic plate with electrodes printed on both sides and a metal plate brass or stainless steel, etc. When DC voltage is applied between the two electrodes of the piezoelectric vibrating plate, the piezoelectric effect leads to mechanical deformation and sound can be emitted so as to achieve the effect of sound amplification at both ends. The buzzer element is for sound generation.

Preferably, the first resonant chamber a and the second resonant chamber [b] form a large and small spaces.

In order to facilitate the positioning of light projection, the central part of the buzzer element [2] is provided with a light-transmitting through-hole [21], above the light-transmitting through-hole [21] is provided with a light source [31] controlled by the main board [3], and at the bottom of the second resonant chamber [b] is provided with a light-transmitting channel [b1] connected to the outside, the light from the light source [31] is projected outward through the light-transmitting through-hole [21], the second resonant chamber [b] and the light-transmitting channel [b1] in turn.

Preferably, a light-transmissive projection part [5] is installed in the light-transmissive channel [b1], the projection part [5] is provided with a projection pattern which can be designed as a predetermined logo, said light source [31] projected on the projection part [5] can project outwardly to show said logo.

Said logo is not constrained and can be of any shape, this example is preferably cross-shaped.

For further sound amplification, wherein the shell [1] or projection part [5] is provided with a sounding through-hole [51] for easy sounding.

The projection part [5] is provided with a light-transmitting column [52] extending into or under the light-transmitting through-hole [21]. The light projected by the light source [31] can be extended to the projection part [5] through the column [52] to prevent light diffusion, and the light-transmitting column [52] can partially block the light-transmitting through-hole [21] to increase the volume of sound amplification.

Because the buzzer element [2] is a thin structure, in order to transmit light in the middle of the buzzer [2] perforated by electricity vibration sound easy to crack, after long-term experiments found that the buzzer element using a special design of thickness and diameter size, can solve this problem. Therefore, this example provides the following preferred data of buzzer element [2], the outer circumference diameter of said buzzer element [2] is: 6.5 mm-50 mm, and the thickness of said buzzer element [2] is: 0.15 mm-0.85 mm.

Preferably, said buzzer element [2] comprises a substrate and a conductive ceramic medium set on the substrate, wherein the substrate being one of a copper sheet, a stainless steel sheet, a nickel alloy sheet and an iron sheet or a combination thereof.

Figure 3:
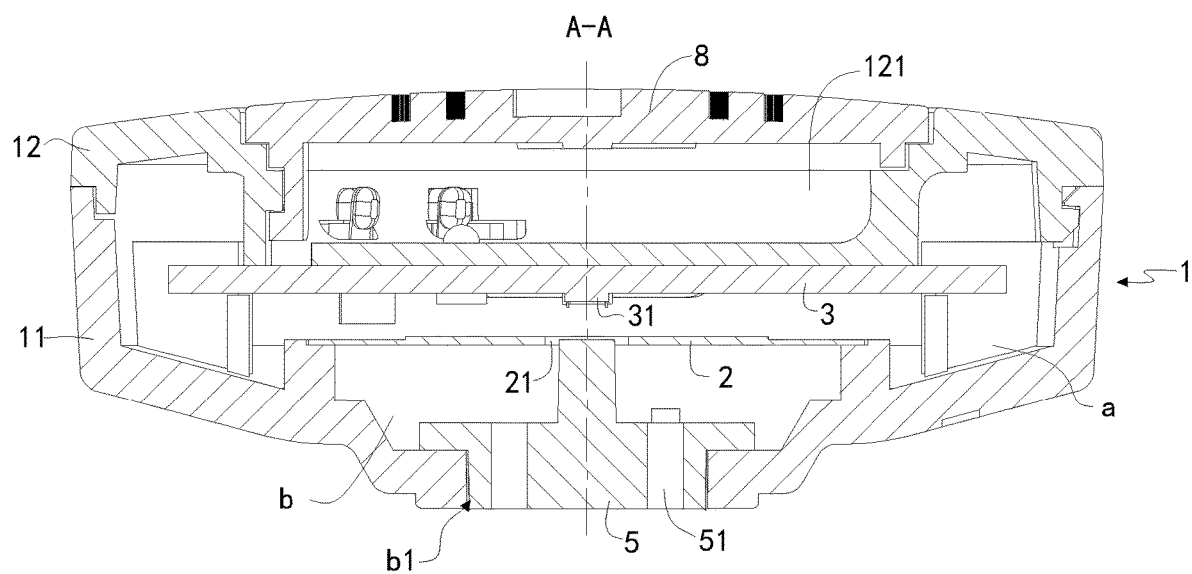
FIG. 3 is a cross-sectional view of A-A in FIG. 2.

Preferably, wherein the main board [3] is mounted in the shell [1] and located above the buzzer element [2], and the main board [3] is connected to the buzzer element [2] by an ejector pin [6]. The cut view A-A in FIG. 3 is not cut to the pin location, so the pin location is not shown. The pin location is indicated in the B-B cut view in FIG. 6.

To facilitate installation, the shell [1] comprises a lower shell [11] and an upper shell [12].

Figure 4:
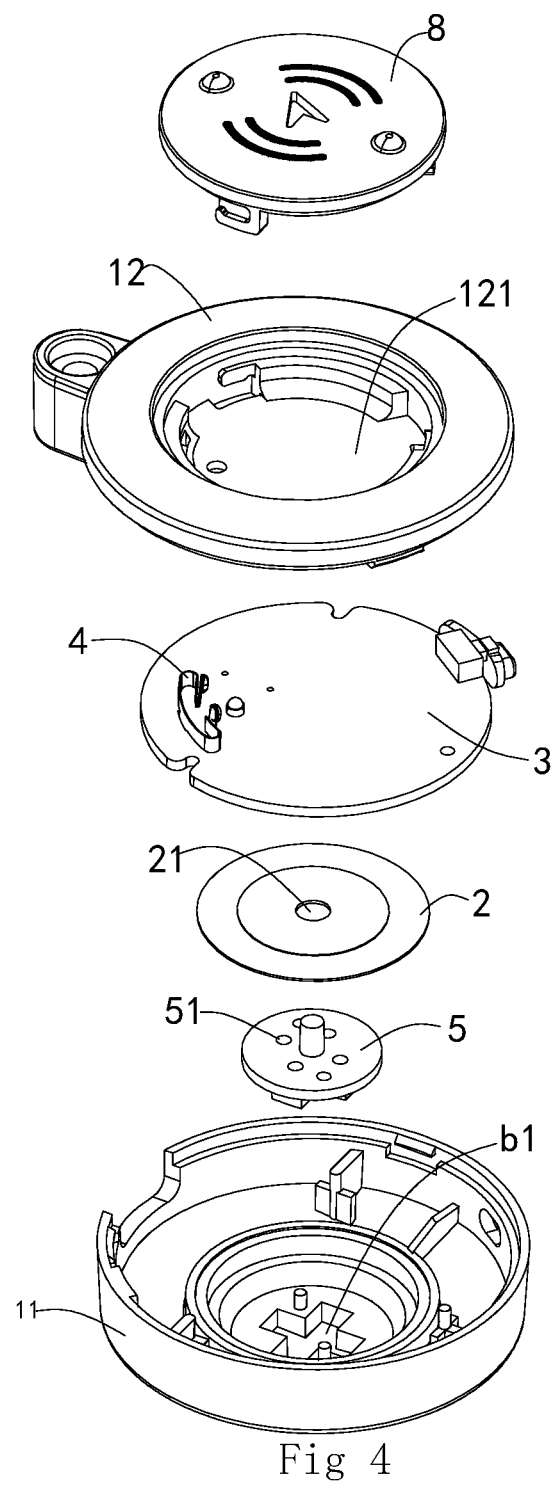
FIG. 4 is a schematic diagram of the explosion of Example I of the present invention.
Figure 5:
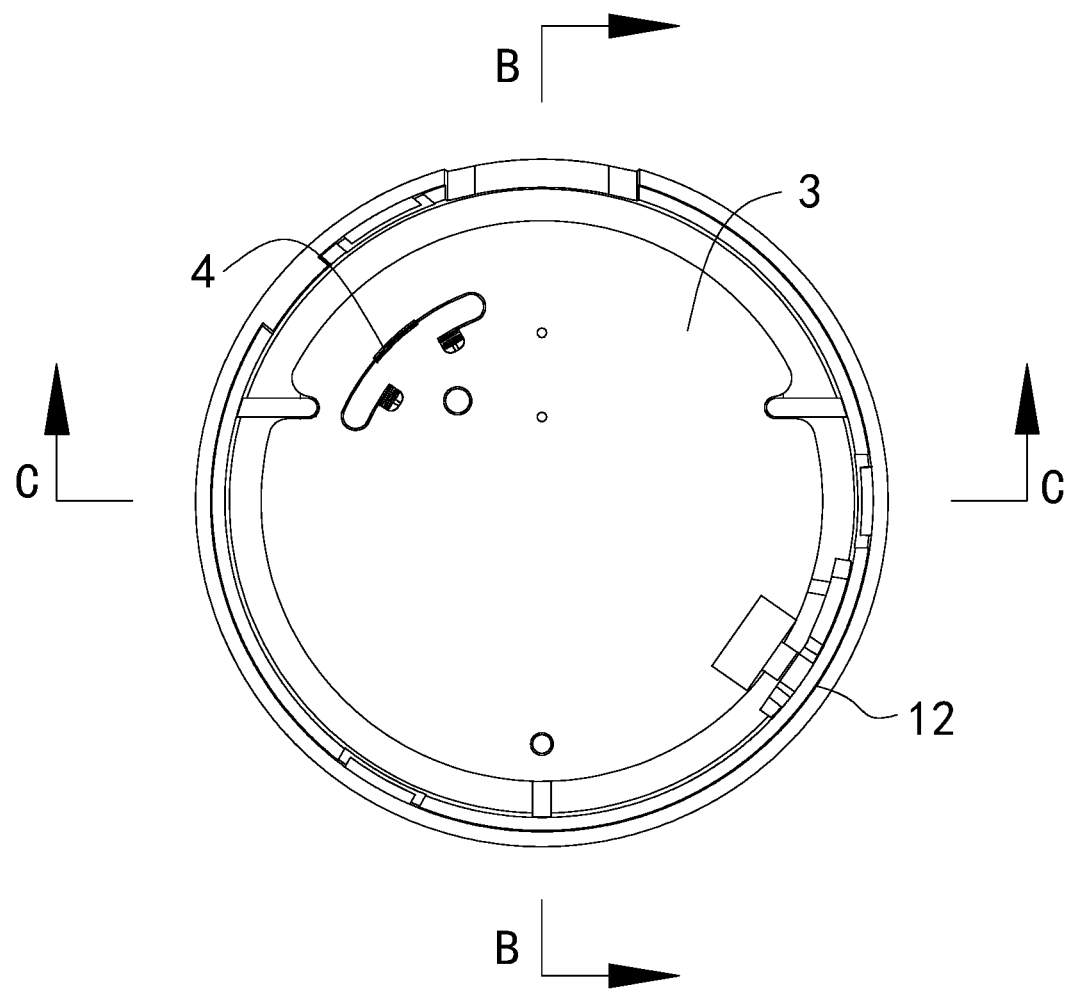
FIG. 5 is a top view of example one of the present invention with the upper shell portion removed
Figure 6:
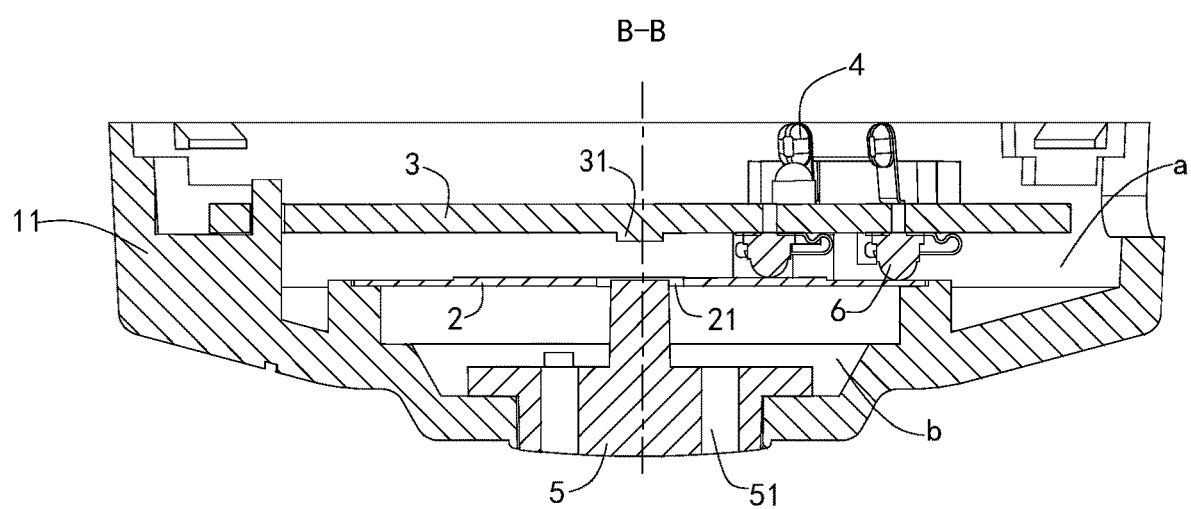
FIG. 6 is a cross-sectional view B-B in FIG. 5.
Figure 7:
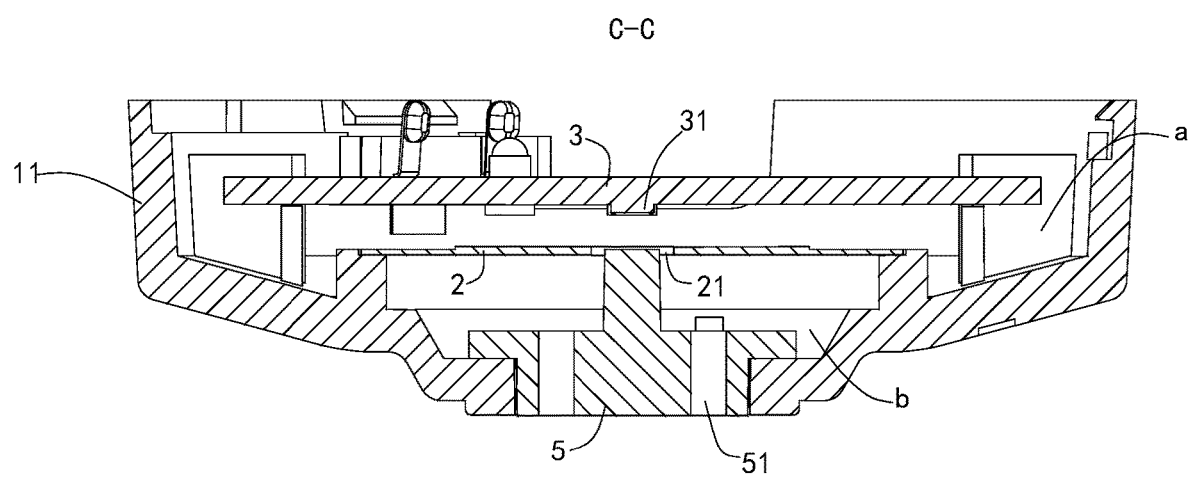
FIG. 7 is a cross-sectional view C-C in FIG. 5.
Figure 8:
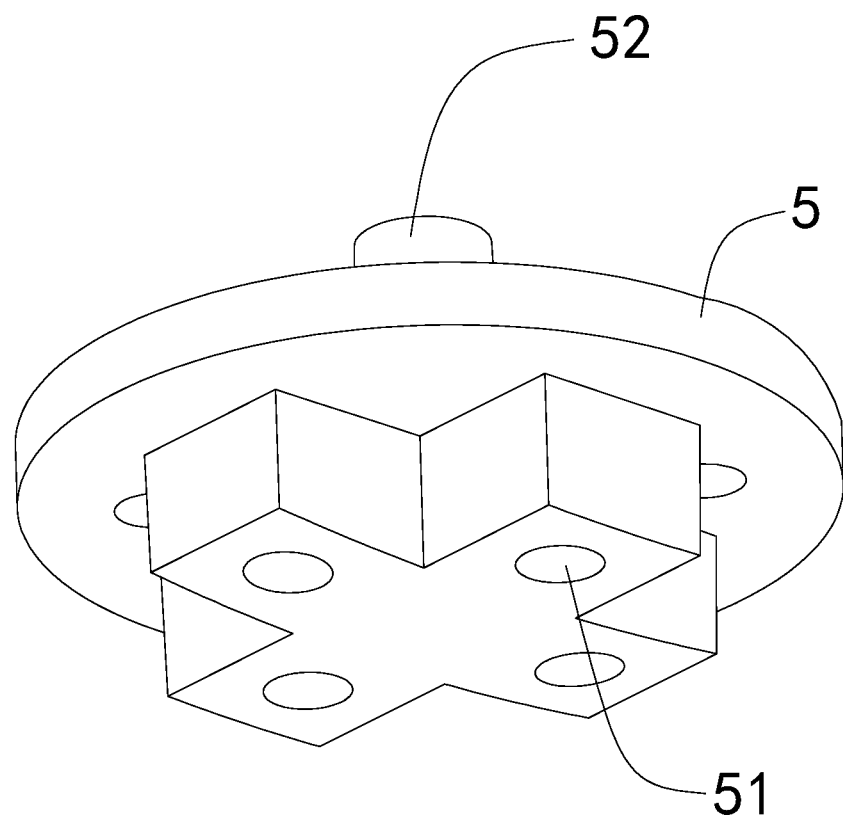
FIG. 8 is a schematic diagram of the structure of the projection part in example one of the present invention.

Preferably, the upper surface of the upper shell [12] is provided with a recessed battery compartment [121], said power supply device for the button battery and installed in the battery compartment [121], in the battery compartment [121] is also covered with a cover [8]. wherein the button battery is connected to the main board using the contact [4] as shown in FIG. 4 for connection.

Preferably, wherein the main board [3] is also provided with a communication module that can communicate with other devices.

In order to ensure that the sound is more concentrated and does not disperse, the single hole diameter of said sounding through-hole for facilitating sound generation does not exceed 10 mm.

In order to help the sound to be amplified by air rotation therein, said second resonance chamber b is in the shape of a funnel with a large top and a small bottom.

Further, in order to help the sound to be amplified by air rotation therein, said second resonant chamber [b] and said first resonant chamber a form a funnel-shaped air circulation system.

Preferably, said light-transmitting through-hole [21] has a diameter of not more than 6 mm.

Example 2

Figure 9:
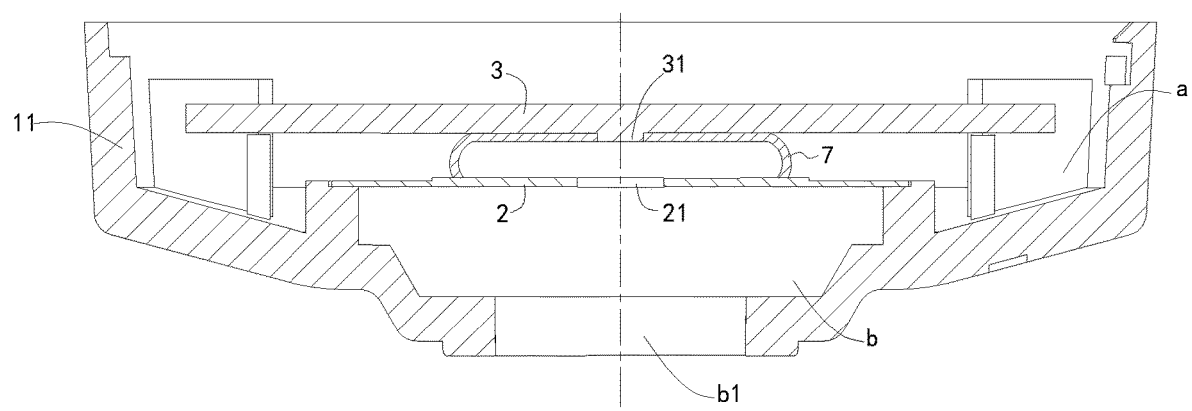
FIG. 9 is a schematic diagram of example two of the present invention.

As shown in FIG. 9, this example differs from example 1, the main board [3] is connected to the buzzer element [2] by means of a resilient folded foot [7]. By using the elastic folded foot [7] for the connection between the main board [3] and the buzzer element [2], the overall structure of the position locator can be thinner compared to the connection of the thimble [6].

Figure 10:
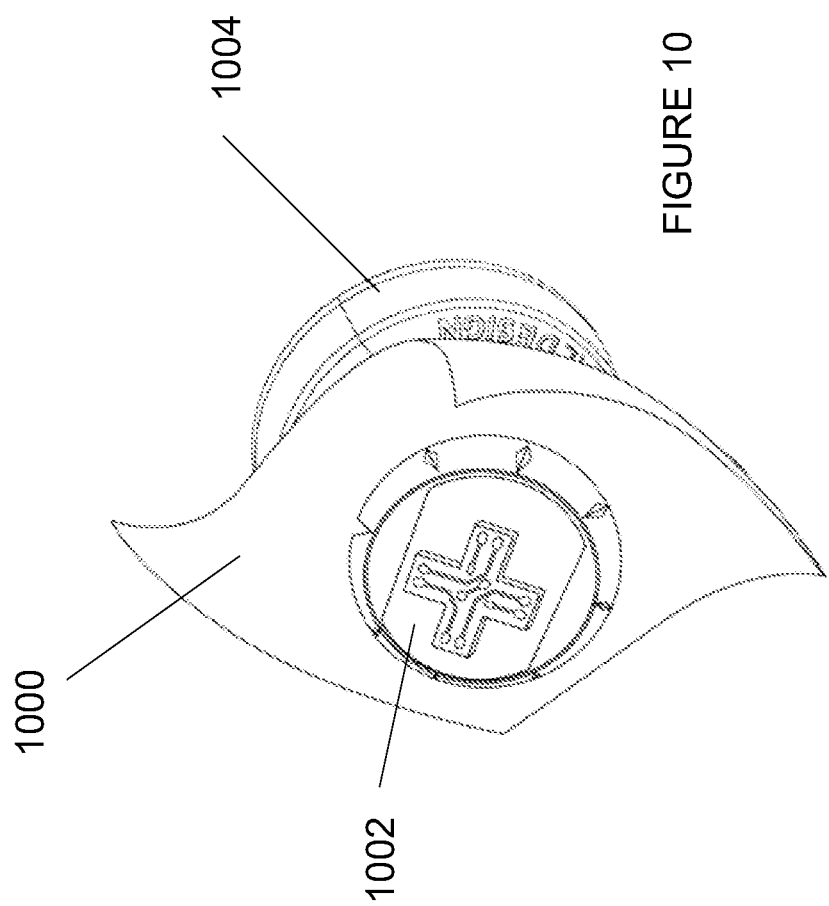
FIGS. 10, 11, 12, 13, 14, 15, 16, 16, 17, 18, 19, 20, 21 and 22 depict the present invention.
Figure 11:
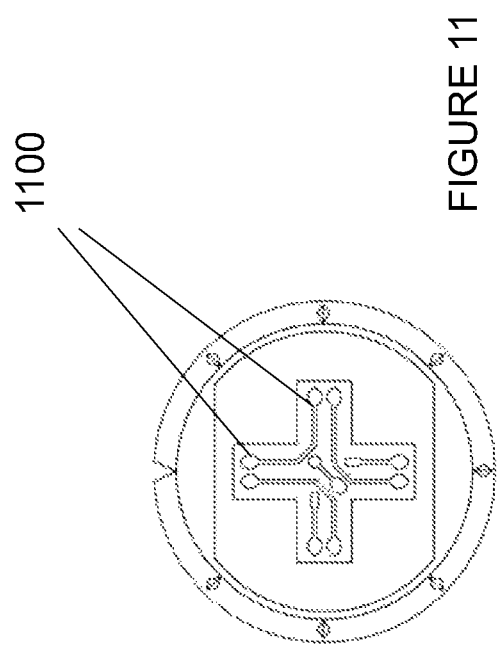
Figure 12:
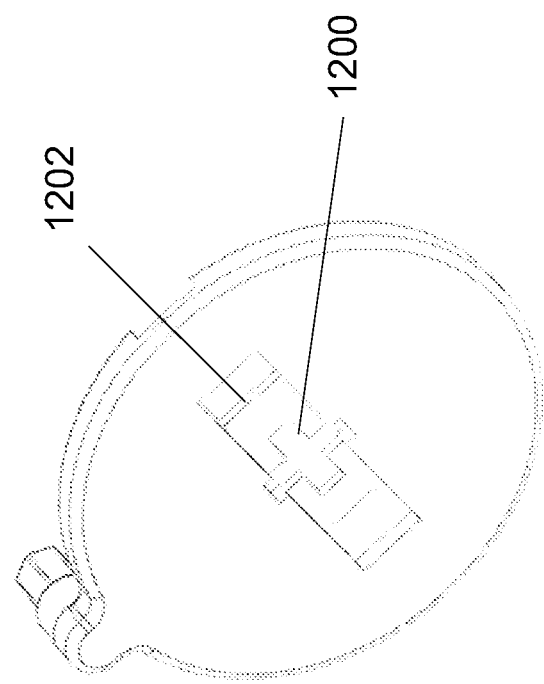
Figure 13:
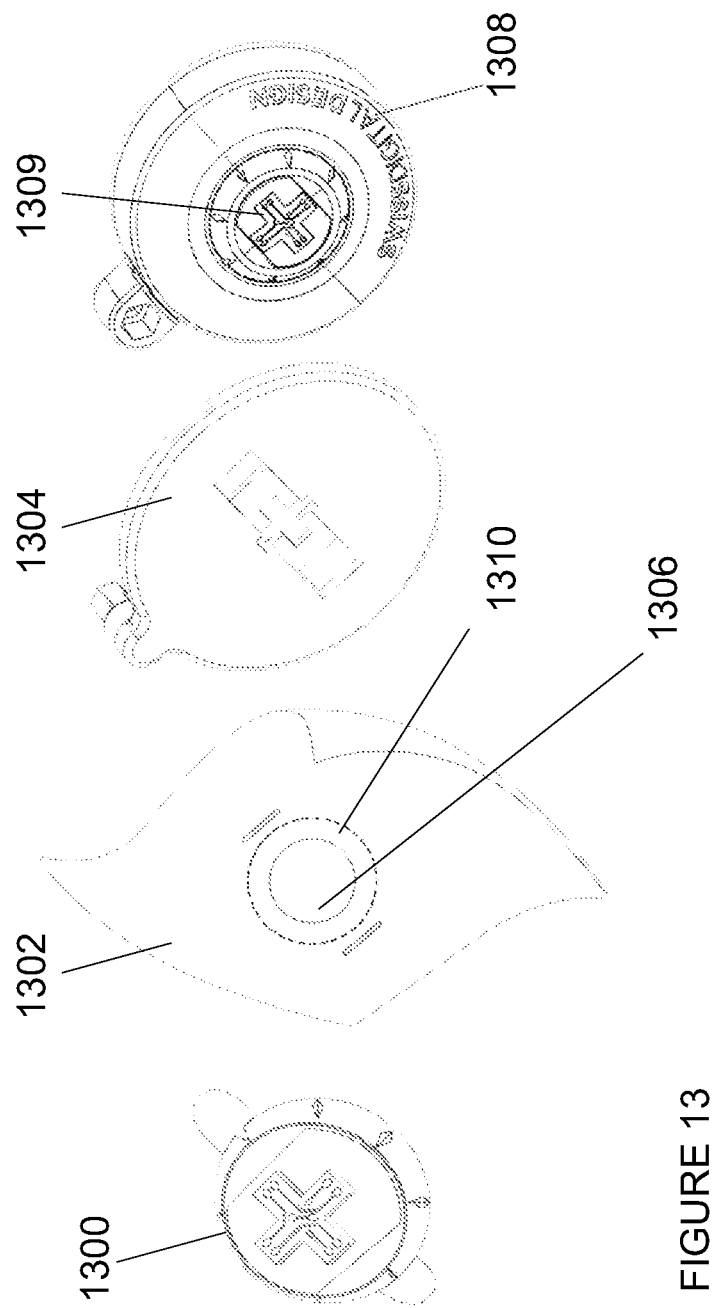
Figure 14:
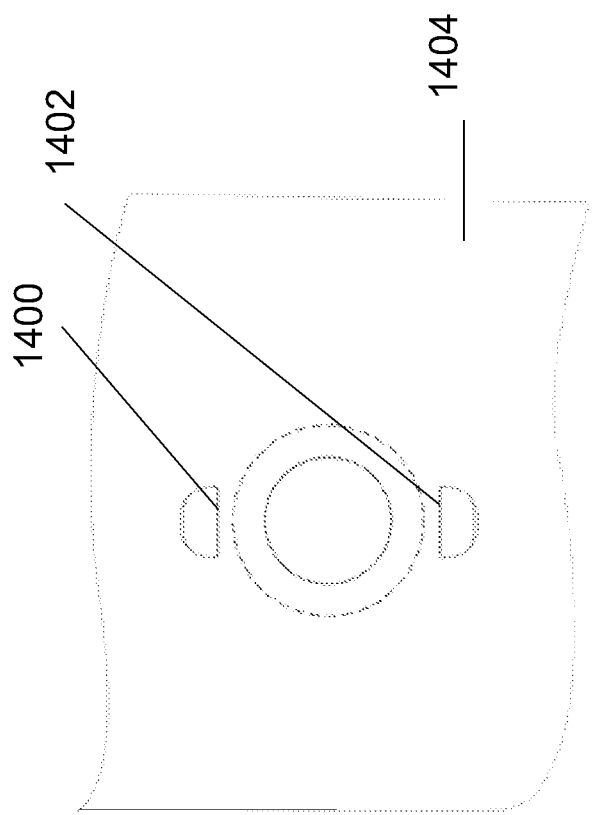
Figure 15:
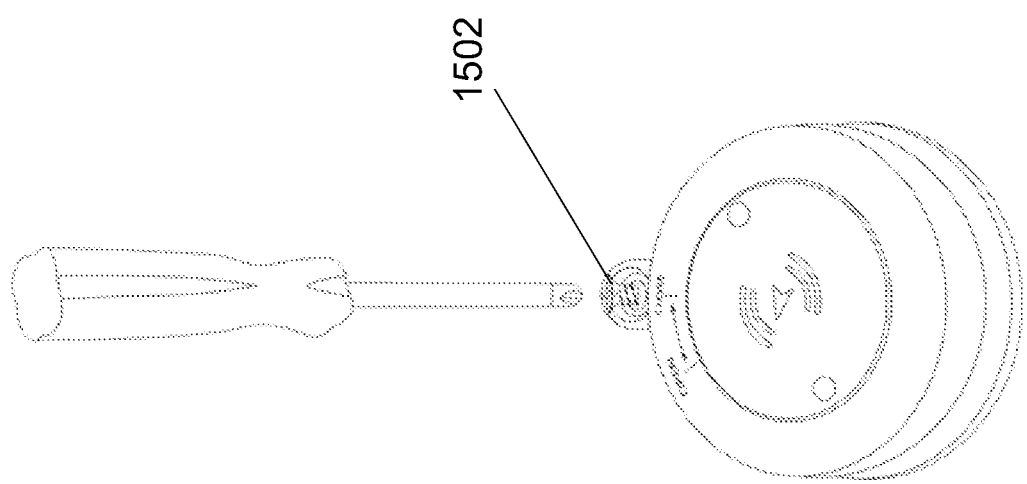
Figure 16:
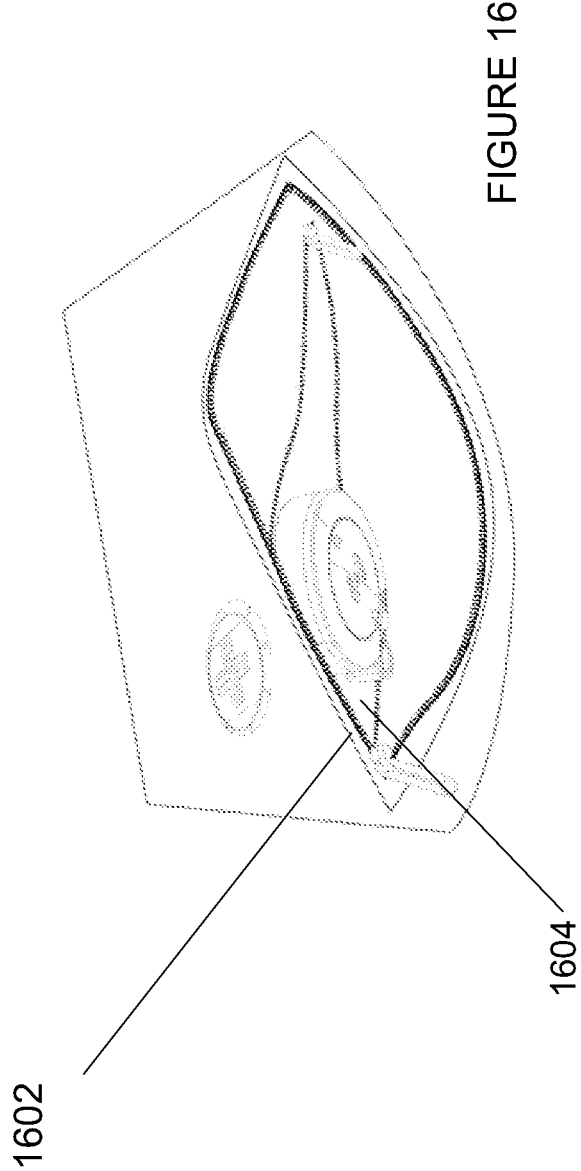
Figure 17:
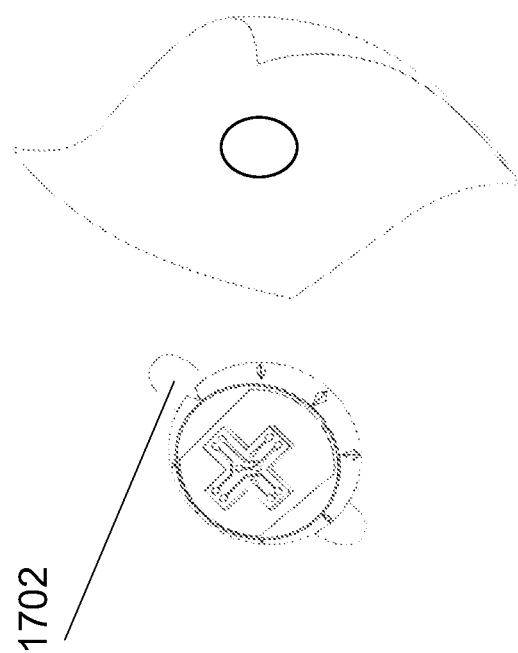

FIG. 10 shows body (1000), position locator (1004) and logo hardware (1002). As shown in FIGS. 11, 12, 13, a removable position locator is shown a removable position locator (1308) having a light source and attachment hardware (1304) for attaching the removable position locator to a body (1302), wherein the attachment hardware (1304) has at least one hardware light-transmitting through-hole (1200), wherein the removable position locator has at least one locator light-transmitting channel (1309) and the light from the light source (31) is projected outward through the light-transmitting channel (1309). The position of the locator light-transmitting channel (1309) is aligned with the position of the hardware light-transmitting through-hole (1200) to allow the light source (31) and locator light-transmitting channel (1309) to project light outward when the position locator is fixed on the hardware. The body has an opening (1306) that is substantially the same or bigger than the hardware light-transmitting through-hole and the opening is substantially aligned with the hardware light-transmitting through hole and the locator light-transmitting channel when the hardware is attached to the body (1302). The attachment hardware may fixed to a back portion of a brand logo hardware (1300). The brand logo hardware may have at least two folding feet (1702, 2000), and the body may have has at least two holes (1400 and 1402) to allow the folding feet pierced through to receive the attachment hardware to attach the attachment hardware to the body (1404). The brand logo hardware may have at least two folding feet (1702) and the body has at least two holes to receive the folding feet. The attachment hardware may have at least two hardware holes (1202) which allow the folding feet on the brand logo hardware to attach to the back of the brand logo hardware. The attachment hardware may be fixed on the body by glue. The body may be fabric, and an edge of the opening is coated by heating cut or glue (1310) or surrounding stitching. This prevents tearing and spreading of the opening.

The attachment hardware may have a recessed portion (2002) to receive the removable position locator. The position locator may be removably attached to the hardware by a screw (1502).

Figure 22:
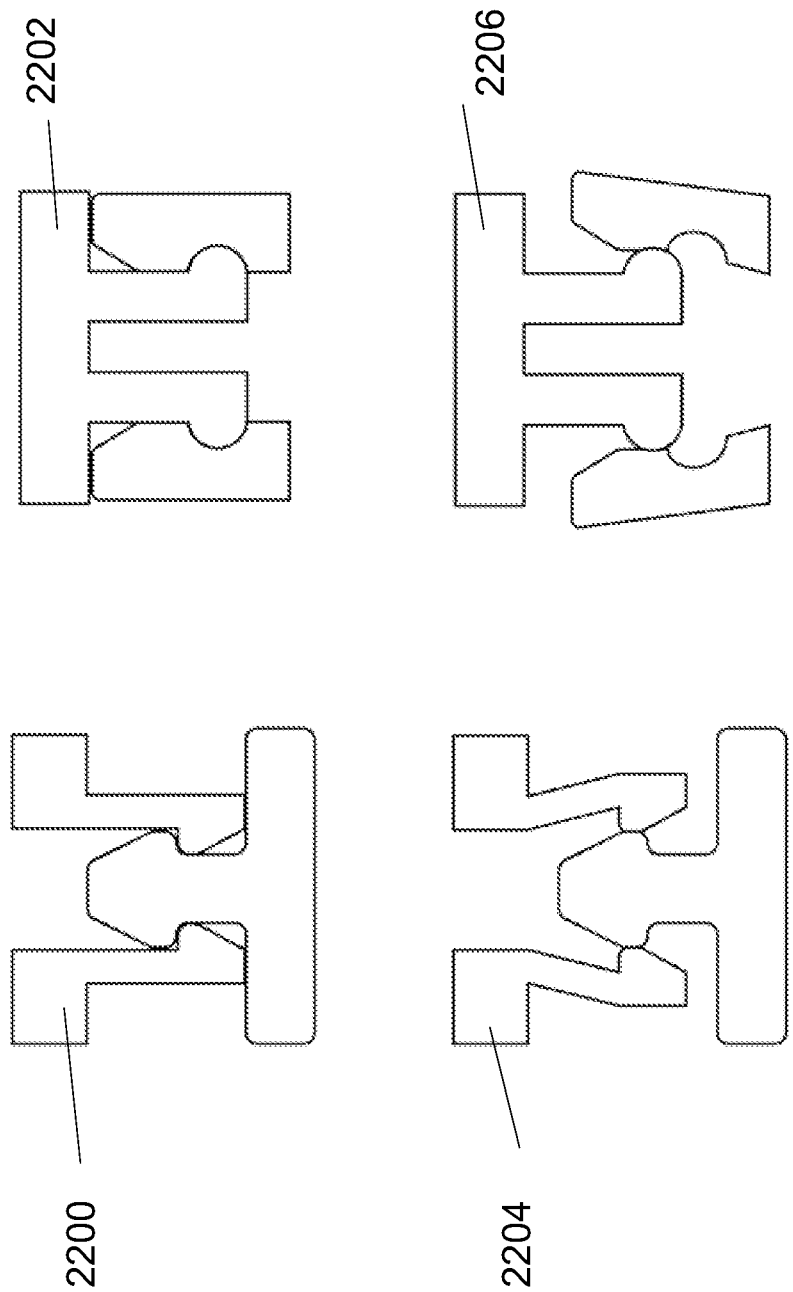

The position locator may be removably fixed to the attachment hardware or logo hardware by a fast clip (2110, 2102, 2104, 2108). The fast clip may consist of two substantially tapered L shaped portions (2102 and 2104) on the attachment hardware (2112) and an attachment clip (2108) having a tapered section (2110) that clips into the two substantially tapered L shaped portions to attach the position locator (2106) to the attachment hardware (2112). And the fast clip parts can be oppositely settled on the attachment hardware and position locator. FIG. 22 depicts different fast clip embodiments (2200, 2202, 2204, 2006).

Figure 18:
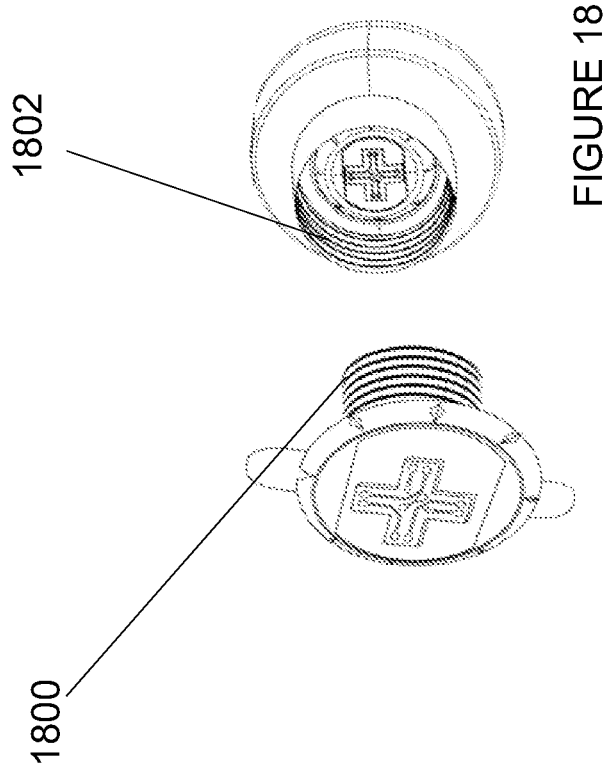
Figure 19:
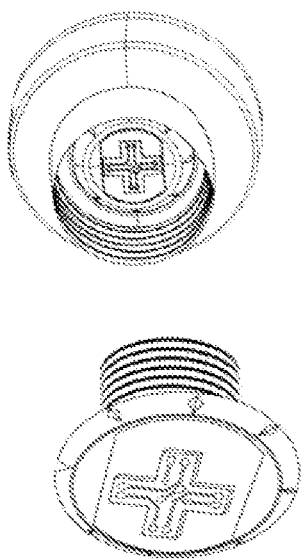
Figure 20:
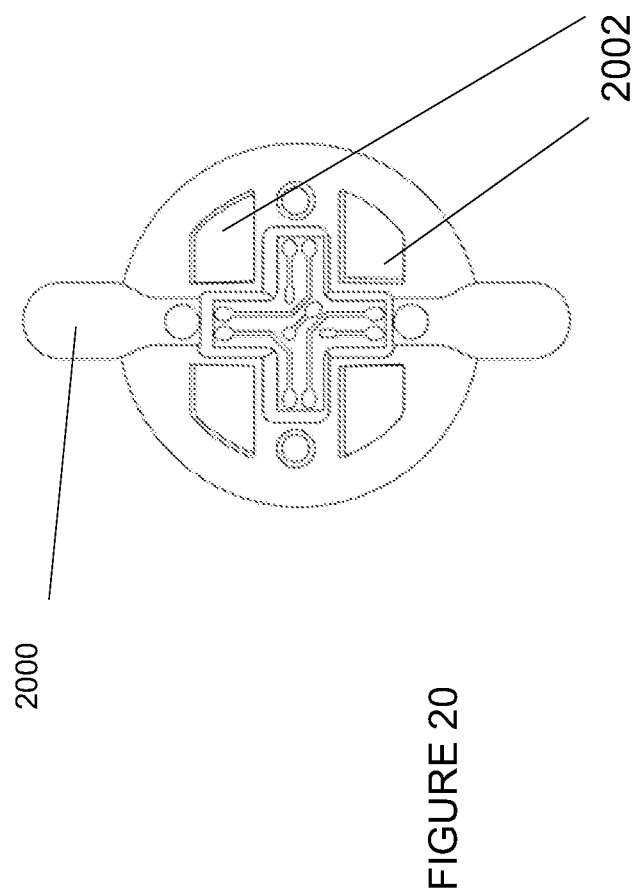
Figure 21:
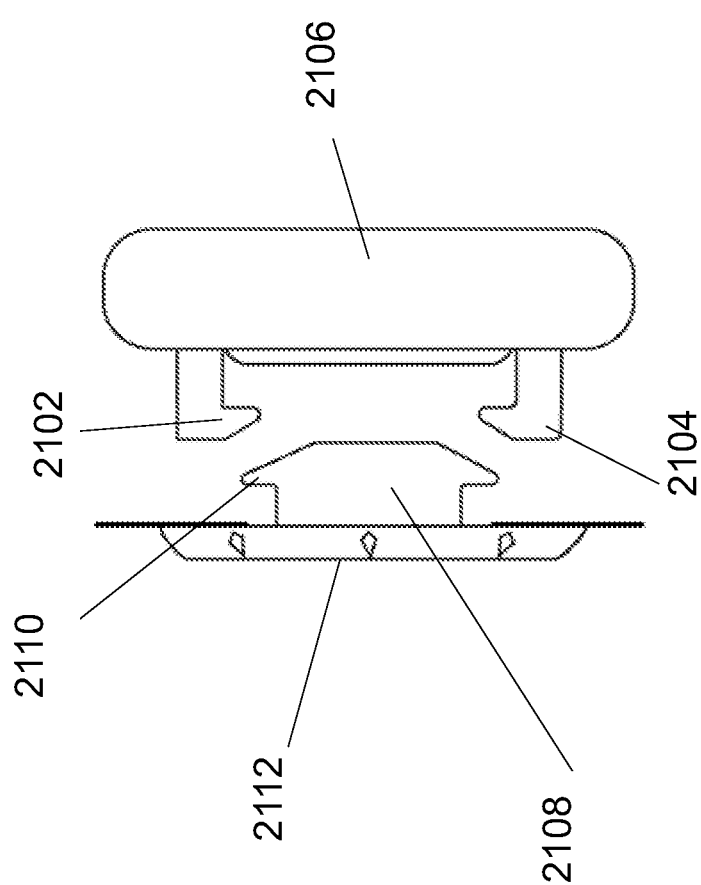

The position locator may be attached to the inner side of the body inside of a pocket (1604). The pocket has an opening (1602) with a size of at least 20 mm to allow user to easily remove or attach the position locator. As shown in FIGS. 18 and 19, the position locator may have has a threaded protruding portion (1800) and the attachment hardware has a corresponding recessed threaded portion (1802). This allows the position locator to be attached to the attachment hardware by rotating the position locator into the attachment portion. And the threaded protruding portion and recessed threaded portion parts can be oppositely settled on the attachment hardware and position locator.

Although the present invention is illustrated and described using specific example and alternatives thereto, it should be understood that various variations and modifications can be implemented as long as they do not depart from the spirit of the present invention. Accordingly, it should be understood that the present invention is not limited in any sense except by the accompanying claims and their equivalents.

I claim:

1. A removable position locator, comprising,
 a shell with a first resonant chamber, a second resonant chamber, a buzzer element, a main board and a power supply
 wherein the first resonant chamber is located above the second resonant chamber located below,
 wherein the buzzer element separates the first resonant chamber and the second resonant chamber,
 wherein the main board is connected to the buzzer element for controlling the position locator power on and off,
 wherein the power supply is connected to the main board for supplying power to the main board,
 wherein a central part of the buzzer element is provided with a light-transmitting through-hole and above the light-transmitting through-hole is a light source controlled by the main board, and at the bottom of the second resonant chamber is a light-transmitting channel connected to the outside, light from said light source is projected outward through the light-transmitting through-hole, the second resonant chamber and the light-transmitting channel in turn,
 attachment hardware for attaching the shell to a body,
 wherein the attachment hardware has at least one hardware light-transmitting through-hole,
 wherein the position of the light-transmitting channel is aligned with the position of the hardware light-transmitting through-hole to allow the light source to project light outward when the shell is fixed on the hardware,
 wherein the body has an opening that is substantially the same or bigger than the hardware light-transmitting through-hole and the opening is substantially aligned with the hardware light-transmitting through hole and the light-transmitting channel when the hardware is attached to the body.

2. A removable position locator as in claim 1, wherein the attachment hardware is fixed to a back portion of a brand logo hardware.

3. A removable position locator as in claim 1, wherein the brand logo hardware has at least two folding feet.

4. A removable position locator as in claim 1, wherein the attachment hardware further comprises at least two hardware holes which allow the folding feet on the brand logo hardware to attach to the back of the brand logo hardware.

5. A removable position locator as in claim 1, wherein the body has at least two holes to allow the folding feet pierced through to receive the attachment hardware to attach the attachment hardware to the body.

6. A removable position locator as in claim 1, wherein the attachment hardware has a recessed portion to receive the removable position locator.

7. A removable position locator as in claim 1, wherein the position locator is removably attached to the hardware by a screw.

8. A removable position locator as in claim 1, wherein the position locator is removably fixed to the attachment hardware by a fast clip.

9. A removable position locator as in claim 1, wherein the position locator is attached to the inner side of the body inside of a pocket.

10. A removable position locator as in claim 9, wherein the pocket has an opening with a size of at least 20 mm to allow user to easily remove or attach the position locator.

11. A removable position locator as in claim 1, wherein the attachment hardware is fixed on the body by glue.

12. A removable position locator as in claim 1, wherein the body is fabric, and an edge of the opening is coated by heating cut or glue or surrounding stitching.

13. A removable position locator as in claim 8, wherein the fast clip consists of two substantially tapered L shaped portions on the attachment hardware and an attachment clip having a tapered section that clips into the two substantially tapered L shaped portions to attach the position locator to the attachment hardware.

14. A removable position locator as in claim 1, further comprising,
   wherein the attachment hardware has logo hardware having at least one hardware light-transmitting through-hole,
   wherein the position of the light-transmitting channel is aligned with the position of the hardware light-transmitting through-hole to allow the light source to project light outward when the position locator is fixed on the hardware,
   wherein the body has an opening that is substantially the same or bigger than the hardware light-transmitting through-hole and the opening is substantially aligned with the hardware light-transmitting through hole and the light-transmitting channel when the hardware is attached to the body.

15. A removable position locator as in claim 14, wherein the position locator has a threaded protruding portion and the attachment hardware has a corresponding recessed threaded portion.

16. A removable position locator as in claim 14, wherein the position locator is removably fixed to the attachment hardware by a fast clip.

* * * * *